United States Patent [19]

Bugg et al.

[11] 4,370,747
[45] Jan. 25, 1983

[54] DATA TRANSMISSION

[75] Inventors: Richard E. F. Bugg, Shirley; Derek J. Parkyn, Sevenoaks, both of England

[73] Assignee: U.S. Philips Corporation, New York, N.Y.

[21] Appl. No.: 216,234

[22] Filed: Dec. 15, 1980

[30] Foreign Application Priority Data

Dec. 21, 1979 [GB] United Kingdom ............... 7944027

[51] Int. Cl.³ .............................................. H03C 3/04
[52] U.S. Cl. ...................................... 375/62; 332/18; 360/43; 375/60
[58] Field of Search .................... 332/10, 16 R, 16 T, 332/17, 18, 19; 360/30, 39, 40, 43; 375/42, 45, 51, 62, 65, 60

[56] References Cited

U.S. PATENT DOCUMENTS

| | | | |
|---|---|---|---|
| 3,408,572 | 10/1968 | Wolf et al. ........................... | 375/65 |
| 3,659,048 | 4/1972 | Zuerblis et al. ..................... | 375/62 |
| 3,806,807 | 4/1974 | Nakamura ........................... | 375/42 |
| 4,170,764 | 10/1979 | Salz et al. ........................... | 332/17 |
| 4,199,821 | 4/1980 | Munday .............................. | 375/60 |

*Primary Examiner*—Benedict V. Safourek
*Attorney, Agent, or Firm*—Thomas A. Briody; Robert T. Mayer; Steven R. Biren

[57] ABSTRACT

A circuit arrangement for transmitting binary data elements '0' and '1' by frequency shift using two tone frequencies f0 and f1. The circuit arrangement comprises a modulator, an exclusive OR-gate and an integrator. A data signal DS produces from the modulator a digital signal DSS which by decoding of the integrator results in a tone signal TS comprising f0 or f1. The action of the OR-gate to which both signals DS and DSS are applied causes the amplitude of the tone signal TS to be substantially the same for each of the tone frequencies f0 and f1. The OR-gate may change either the effective resistive input into the integrator for each tone frequency or it may change the amplitude of the signal DSS for each tone frequency.

8 Claims, 10 Drawing Figures

DATA TRANSMISSION

BACKGROUND OF THE INVENTION

This invention relates to data transmission systems in which binary data elements are transmitted by frequency shift (or change) using two tone frequencies f0 and f1 corresponding to the transmission of data elements '0' and '1', respectively. The invention relates more particularly to a circuit arrangement for use in such data transmission systems for generating two such tone frequencies f0 and f1 in response to a data signal consisting of the binary data elements.

SUMMARY OF THE INVENTION

According to the invention such a circuit arrangement comprises; modulator means responsive to the data signal to produce a digital signal having a predetermined pattern of binary '1' and binary '0' values, the pattern occurring for the duration of each data element '0' in the applied data signal at a first bit rate and occurring for the duration of each data element '1' at a second bit rate, said first and second bit rates being appropriate for the generation of the respective tone frequencies f0 and f1; integrator means responsive to the digital signal to produce by delta modulation decoding of the digital signal an output signal which conforms to the tone frequency f0 when the digital signal has said predetermined pattern occurring at said first bit rate and to the tone frequency f1 when the digital signal has said predetermined pattern occurring at said second bit rate; and control means responsive to the data signal to effect an adaptive control on the amplitude of the output signal such that this amplitude tends towards the same level for each of the two tone frequencies f0 and f1.

In a circuit arrangement according to the invention, the provision of the control means to effect an adaptive control on the amplitude of the output signal affords the advantage that it compensates for the tendency for this output signal to be at different amplitude levels for the two tone frequencies f0 and f1, due to the low-pass filter action of the integrator means exerting less attenuation on the lower of the two tone frequencies.

In a first embodiment of circuit arrangement according to the invention, the control means is arranged to so alter the value of a resistive input into the integrator means when the subsisting data element of the data signal pertains to the lower of the two tone frequencies that the delta modulation slope of the integrator means is decreased, such that when delta modulation decoding of the digital signal occurs, the resulting output signal has a smaller amplitude than it would otherwise have, which smaller amplitude level tends towards that which obtains when the subsisting data element of the data signal pertains to the higher of the two tone frequencies.

In a second embodiment of circuit arrangement according to the invention, the control means is arranged to so alter the mean amplitude level of the digital signal when the subsisting data element of the data signal pertains to the lower of the two tone frequencies that when delta modulation decoding of the digital signal occurs, the resulting output signal has an amplitude level which tends towards that which obtains when the subsisting data element of the data signal pertains to the higher of the two tone frequencies.

Each of these embodiments achieves the advantage of a constant amplitude level of output signal from the integrator means for both of the tone frequencies.

In each of these first and second embodiments the control means can include an exclusive OR-gate which has the digital signal connected to a first input and the data signal controlling a second input such that the control exercised by the data signal permits the digital signal to pass uncontrolled to the integrator means only when a data element pertaining to the higher tone frequency occurs in the data signal, the exclusive OR-gate being selectively operated by the combination of the logic levels of both the data signal and the digital signal when a data element pertaining to the lower tone frequency occurs to provide an output which effects said control for reducing the amplitude level of the output signal from the integrator means.

BRIEF DESCRIPTION OF THE DRAWING

In order that the invention may be more fully understood, reference will now be made by way of example to the accompanying drawing, in of which.

DETAILED DESCRIPTION

Figure 1:
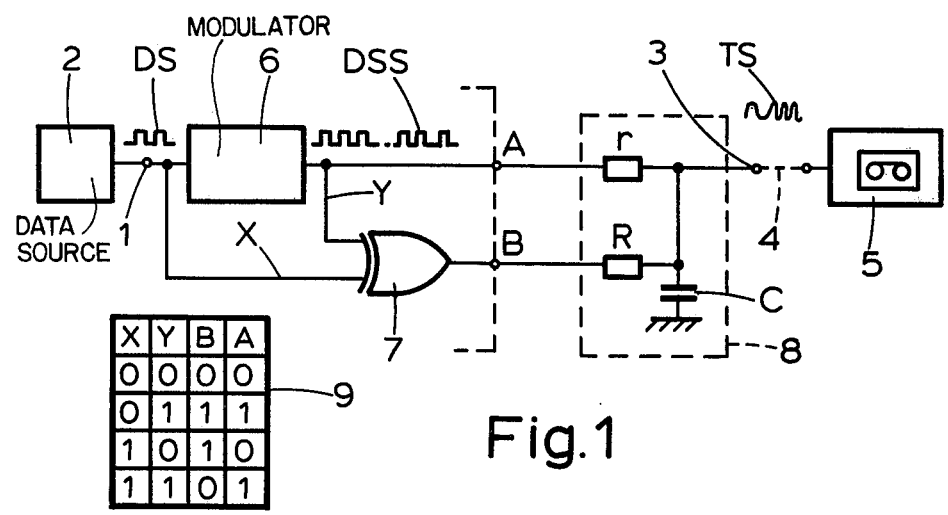
FIG. 1 shows a first embodiment of a circuit arrangement for tone generation according to the invention.

Referring to the drawings, the circuit arrangement shown in FIG. 1 is supplied at an input terminal 1 with a data signal DS from a data source 2. This data signal DS consists of binary data elements '0' and '1', as illustrated in waveform diagram (a) in FIG. 4. In response to this data signal DS the circuit arrangement is operable to produce at an output terminal 3 a tone signal TS consisting of two tone frequencies f0 and f1 which correspond, respectively, to the data elements '0' and '1' in the data signal DS. In this embodiment the tone frequency f0 is assumed to be the higher of the two frequencies, but this is optional. Typical frequency values are f0=2600 Hz and f1=1300 Hz. This tone signal TS is illustrated in waveform diagram (b) in FIG. 4. The transformation of the data signal DS into the tone signal TS becomes necessary in certain applications, for instance where the information carried by the data signal DS is to be recorded on a standard audio cassette tape. The characteristics of such a cassette tape would not enable the information to be recorded therein if the data signal DS were applied directly to an audio tape recorder. This application of the circuit arrangement is exemplified in FIG. 1 by the connection of the output terminal 3 via a link 4 to an audio tape recorder 5.

To effect the transformation of the data signal DS into the tone signal TS, the circuit arrangement of FIG. 1 comprises a modulator 6, an exclusive OR-gate 7 and an integrator 8. The modulator 6 has the data signal DS applied to it and is responsive thereto to produce a digital signal DSS having a predetermined pattern of binary '0' and binary '1' values. This predetermined pattern repeats for the duration of each data element '0' in the applied data signal DS at a first bit rate and repeats for the duration of each data element '1' at a second bit rate. Waveform diagram (d) in FIG. 4 illustrates a predetermined binary pattern for the digital signal DSS, this pattern being repeated at a first bit rate to form the digital signal DSS(f0) with respect to the data element '0', and being repeated at a second bit rate to form the digital signal DSS (f1) with respect to the data element '1'.

The digital signal DSS is applied directly to a first resistive input r of the integrator 8 via an output terminal A. A second output terminal B is connected to a second resistive input R of the integrator 8, this second output terminal B being fed with the output from the exclusive OR-gate 7. A first input Y of the gate 7 has the digital signal DSS applied to it and a second input X of the gate 7 has the data signal DS applied to it. A truth table 9 gives the logic operations for the circuit arrangement, from which table it can be seen that the two output terminals A and B have the same logic level when there is a data element '0' present in the data signal DS, whereas the output terminals A and B have opposite logic levels when there is a data element '1' present in the data signal DS. As a result, the effective input resistive Reff. into the integrator 8 is r.R/R+r when the subsisting data element is a '0', and is r.R/R−r when the subsisting data element is a '1'. The resistive input that currently obtains combines with a capacitor C in the integrator 8 to perform a delta modulation decoding operation on the digital signal DSS as thus selectively applied to it. Because of the different values of resistive input for the two bit rates of the digital signal DSS, different delta modulation slopes (i.e. different RC time constants) are used for the decoding operation. This is illustrated in waveform diagram (c), in which there is shown a pure sine wave SW(f0) for the frequency f0 and a pure sine wave SW(f1) for the frequency f1. Superimposed on these two sine waves are respective approximation sine waves ASW(f0) and ASW(f1) which are generated as the output voltage from the integrator 8 and thus form the tone signal TS. It is to be appreciated that only one or the other of these two approximation sine waves would be generated at a time in accordance with the data element content of the data signal DS. Inspection of waveform diagrams (c) and (d) together will show that a succession of binary '1' values in the digital signals DSS(f0) and DSS(f1) produce the rising slope of the relevant approximation sine wave, and a succession of binary '0' values produce the falling slope. The peaks are approximated by alternate binary '1' and binary '0' values.

Figure 2:
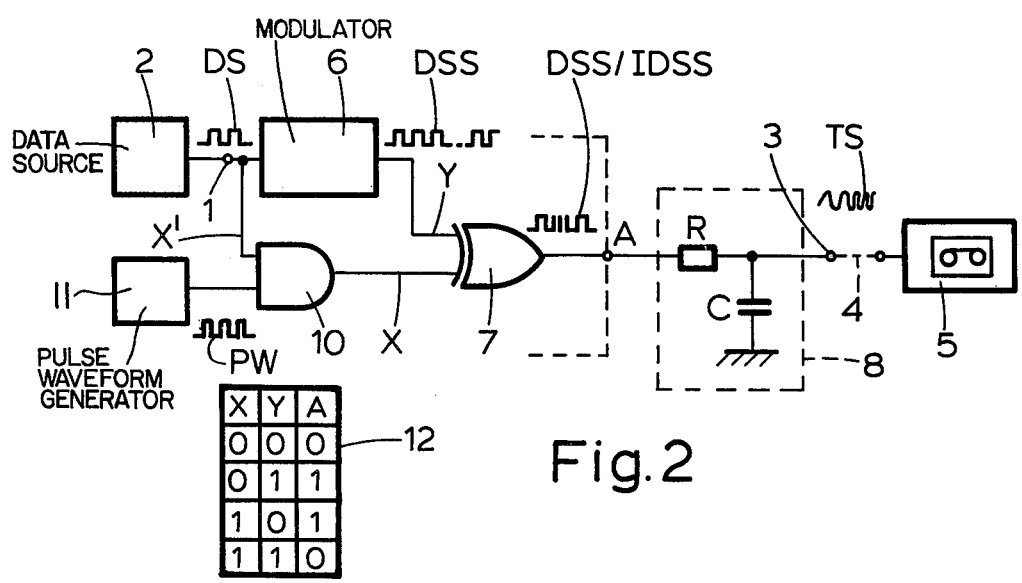
FIG. 2 shows a second embodiment of a circuit arrangement for tone generation according to the invention.

The circuit arrangement shown in FIG. 2 is in many respects similar to that shown in FIG. 1 and corresponding elements in these two figures have been given the same reference letters or numerals. Additionally, the circuit arrangement shown in FIG. 2 comprises an AND-gate 10 and a pulse waveform generator 11, while its integrator 8 has only a single resistive input R. The pulse waveform generator 11 is operable to produce a pulse waveform PW having a mark-to-space ratio that is not equal to unity, this pulse waveform being applied to a first input of the AND-gate 10. The data signal DS is applied to a second input of the AND-gate 10, so that the pulse waveform PW is produced at the output of the AND-gate 10 when a data element '1' occurs in the data signal DS.

The effect of gating the pulse waveform PW (instead of the data signal DS) with the digital signal DSS in the gate 7 is to reduce the effective mean amplitude of the digital signal DSS as applied to the integrator 8. However, since the pulse waveform as thus gated depends on the presence of a data element '1' in the data signal DS, this mean amplitude reduction occurs only in respect of the lower tone frequency f1, of the two possible tone frequencies to be generated. Thus, the output from the gate 7 is either an interrupted digital signal IDSS for generating the tone frequency f1 or an uninterrupted digital signal for generating the tone frequency f0. As a result, the output voltage at the output terminal 3 of the integrator 8 tends to have the same level for each of these two frequencies. Without this amplitude correction the output voltage level for the lower frequency f1 would tend to be higher than for the higher frequency f0 because of the low-pass filter effect of the integrator 8. The form of the pulse waveform PW is illustrated in waveform diagram (e) of FIG. 4 and the resulting "interrupted" digital signal IDSS at the output of the exclusive OR-gate 7 is illustrated in waveform (f).

Figure 3A:
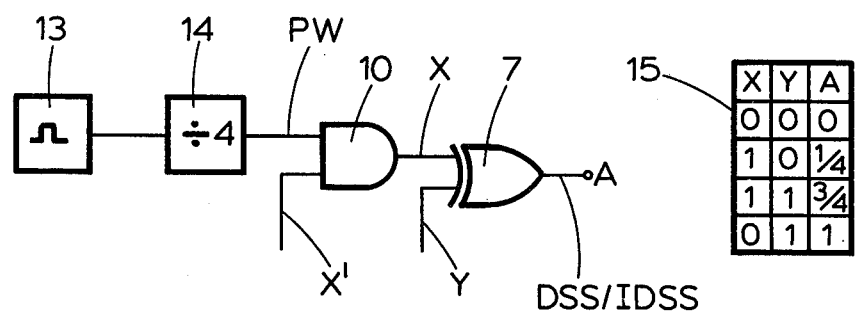
FIGS. 3a and 3b show modifications for the circuit arrangement of FIG. 2.

A convenient arrangement for generating the pulsewaveform PW is shown in FIG. 3a. This arrangement comprises a clock pulse source 13 and a frequency divider 14. Assuming that the frequency divider 14 is a divide-by-four divider, as shown, then the mark-to-space ratio of the pulse waveform PW is 1:4. The mean amplitude of the interrupted digital signal IDSS at the output terminal A is then in accordance with the truth table 15. In other words, as illustrated in waveform diagram (f) in FIG. 4, the interrupted digital signal IDSS is equivalent to the mean amplitude signal M/IDSS.

Figure 3B:
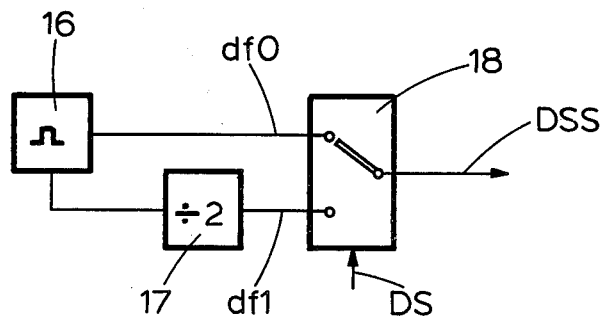
Figure 4A:
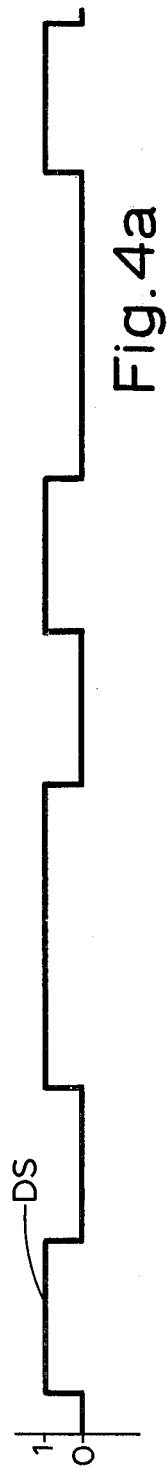
FIGS. 4a–4f shows explanatory waveforms diagrams.
Figure 4B:
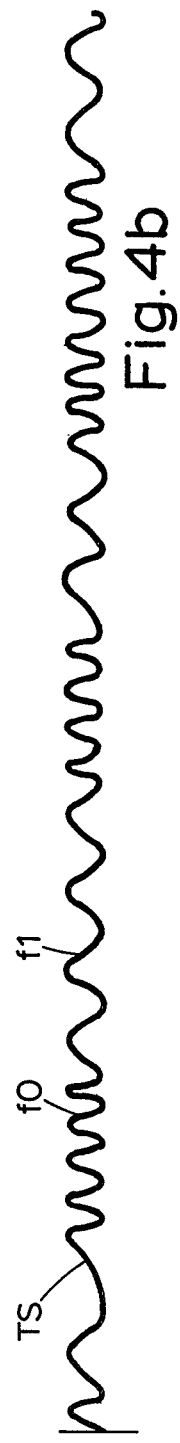
Figure 4C:
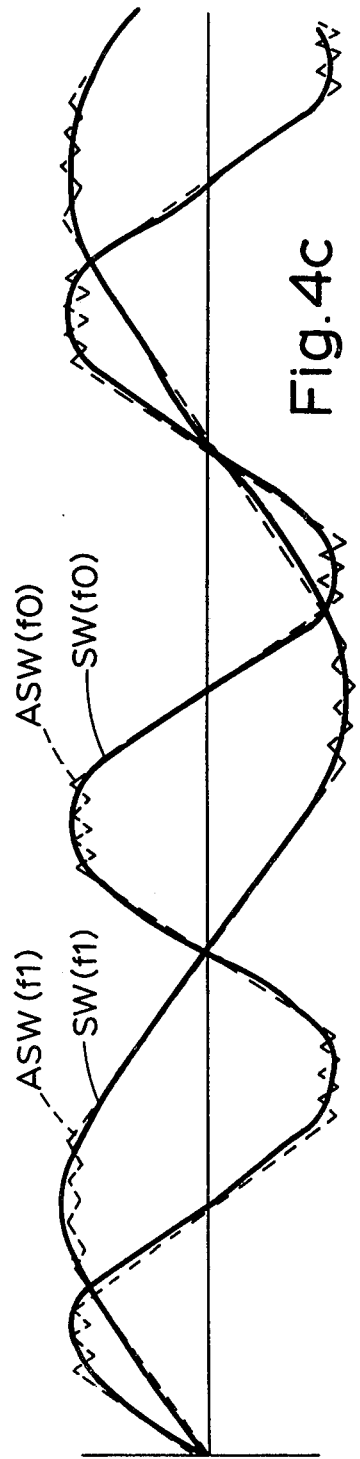
Figure 4D:
Figure 4E:
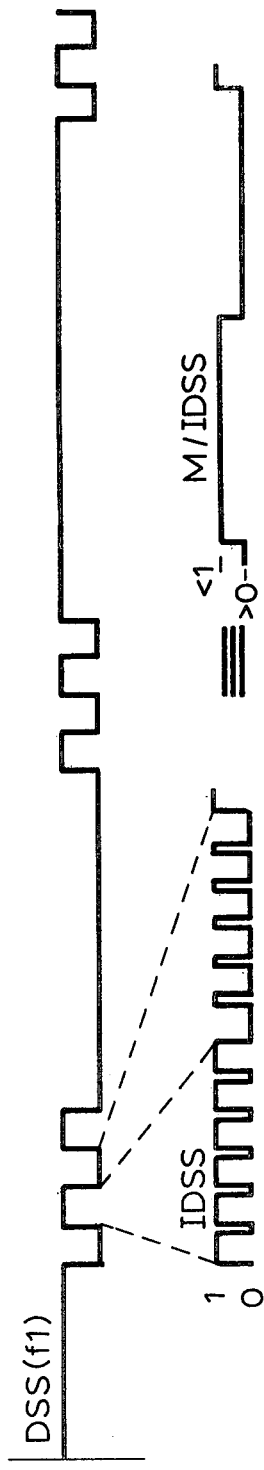
Figure 4F:

The modulator 6 in each of the circuit arrangements of FIGS. 1 and 2 can be a read-only memory in which the predetermined binary pattern for forming the digital signal DSS is stored, such a read-only memory being responsive to the data signal DS and to clock pulses (not shown) to produce the predetermined binary pattern at the relevant one of the two bit rates in accordance with the subsisting data element in the data signal DS. Alternatively, the modulator 6 can be comprised, as shown in FIG. 3b, by a clock pulse source 16, a divide-by-two frequency divider 17 and a switch 18. The clock pulse source 16 produces a pulse train of frequency df0, and the frequency divider 17 produces a pulse train of frequency df1. The switch 18, which is shown as a mechanical switch but which in practice would be implemented electronically, is switched by the data signal DS to produce the digital signal DSS with the bit frequency f0 when a data element '0' occurs and with the bit frequency f1 when a data element '1' occurs. In the general case, the frequency divider 17 can be a ÷n divider.

In the implementation of a circuit arrangement according to the invention the integrator means can be approximated by a low-pass filter as has effectively been exemplified by the RC-construction of the integrator 8 in FIGS. 1 and 2. The low-pass filter action produces the analog tone signal in response to the applied digital signal.

We claim:

1. A circuit arrangement for use in a data transmission system in which binary data elements are trasmitted by frequency shift using two tone frequencies f0 and f1 corresponding to the transmission of data elements '0' and '1', respectively, said circuit arrangement being operable to generate two such tone frequencies f0 and f1 in response to a data signal consisting of the binary data elements, said circuit arrangement comprising; modulator means responsive to the data signal to produce a digital signal having a predetermined pattern of binary '1' and binary '0' values, the pattern occurring for the duration of each data element '0' in the applied data signal at a first bit rate and occurring for the duration of each data element '1' at a second bit rate, said first and second bit rates being appropriate for the generation of the respective tone frequencies f0 and f1; integrator means responsive to the digital signal to produce by decoding of the digital signal an output signal which conforms to the tone frequency f0 when the digital signal has said predetermined pattern occurring at said first bit rate and to the tone frequency f1 when the digital signal has said predetermined pattern occurring at said second bit rate; and control means responsive to the data signal to effect an adaptive control of the amplitude of the output signal by controlling the input to said integrator means such that this amplitude tends towards the same level for each of the two tone frequencies f0 and f1.

2. A circuit arrangement as claimed in claim 1, wherein the control means is arranged to so alter the value of a resistive input into the integrator means when the subsisting data element of the data signal pertains to the lower of the two tone frequencies that the slope of the integrator means is decreased, such that when decoding of the digital signal occurs, the resulting output signal has a smaller amplitude than it would otherwise have, which smaller amplitude level tends towards that which results when the subsisting data element of the data signal pertains to the higher of the two tone frequencies.

3. A circuit arrangement as claimed in claim 1, wherein the control means comprises means for so altering the mean amplitude level of the digital signal when the subsisting data element of the data signal pertains to the lower of the two tone frequencies that when decoding of the digital signal occurs, the resulting output signal has an amplitude level which tends towards that which results when the subsisting data element of the data signal pertains to the higher of the two tone frequencies.

4. A circuit arrangement as claimed in claim 3, wherein the control means includes an exclusive OR-gate which has the digital signal connected to a first input and the data signal connected to a second input such that the data signal permits the digital signal to pass uncontrolled to the integrator means only when a data element pertaining to the higher tone frequency occurs in the data signal, the exclusive OR-gate being selectively operated by the combination of the logic levels of both the data signal and the digital signal when a data element pertaining to the lower tone frequency occurs to provide an output which effects said control for reducing the amplitude level of the output signal from the integrator means.

5. A circuit arrangement as claimed in claim 4, wherein the control means further includes an AND-gate having a first input to which the data signal is applied and a second input to which there is applied a pulse waveform having a mark-to-space ratio not equal to unity, the logic levels of said pulse waveform and the data signal being such that the output signal from the AND-gate comprises said pulse waveform when the subsisting data element of the data signal pertains to the lower of the two tone frequencies, said output signal from the AND-gate being applied to said second input of the exclusive OR-gate and the logic levels of this output signal and the digital signal which is applied to the first input of the exclusive OR-gate being such that the output signal from the latter forms the digital signal when the altered means amplitude in that each logic level thereof has interruptions therein at the frequency of the pulse waveform, the interruptions in one logic level reducing the mean amplitude of that level and the interruptions in the other logic level increasing the mean amplitude of that level.

6. A circuit arrangement as claimed in claim 5, wherein said pulse waveform is produced by the combination of a clock pulse source and a divide-by-n frequency divider which is responsive to the clock pulses of frequency fc to produce a pulse wave form of frequency fc/n having a 1;(n−1) mark/space ratio.

7. A circuit arrangement as claimed in claim 8 wherein the control means has a first resistive input r into the integrator means to which said digital signal is applied directly, and a second resistive input R into the integrator means to which the output signal from the exclusive OR-gate is applied, the data signal being connected directly to the second input of the exclusive OR-gate and the logic levels of this data signal and the digital signal which is applied to the first input of the exclusive OR-gate being such that the effective resistive input into the integrator means is r.R/R+r when the subsisting data element of the data signal pertains to the higher of the two tone frequencies and is r.R/R−r when the subsisting data element of the data signal pertains to the lower of the two tone frequencies, whereby the digital signal as applied to the integrator means via said first and second resistive inputs is decoded using different RC time constants for its two bit rates.

8. A circuit arrangement as claimed in claim 2, wherein the control means includes an exclusive OR-gate which has the digital signal connected to a first input and the data signal connected to a second input such that the data signal permits the digital signal to pass uncontrolled to the integrator means only when a data element pertaining to the higher tone frequency occurs in the data signal, the exclusive OR-gate being selectively operated by the combination of the logic levels of both the data signal and the digital signal when a data element pertaining to the lower tone frequency occurs to provide an output which effects said control for reducing the amplitude level of the output signal from the integrator means.

* * * * *

UNITED STATES PATENT AND TRADEMARK OFFICE
CERTIFICATE OF CORRECTION

PATENT NO. : 4,370,747
DATED : January 25, 1983
INVENTOR(S) : Richard E.F. Bugg Et Al It is certified that error appears in the above—identified patent and that said Letters Patent is hereby corrected as shown below:

Col. 6, line 23, delete ";" and substitute --:--

Signed and Sealed this

Third Day of May 1983

[SEAL]

Attest:

GERALD J. MOSSINGHOFF

Attesting Officer        Commissioner of Patents and Trademarks